United States Patent [19]

Henninghaus

[11] 4,184,794
[45] Jan. 22, 1980

[54] DEVICE FOR MACHINING THE INTERNAL WALL OF A CYLINDER

[75] Inventor: Franz Henninghaus, Dormagen, Fed. Rep. of Germany

[73] Assignee: Ferdinand Henninghaus, Dusseldorf, Fed. Rep. of Germany

[21] Appl. No.: 894,503

[22] Filed: Apr. 7, 1978

[30] Foreign Application Priority Data

Apr. 9, 1977 [DE] Fed. Rep. of Germany ....... 2715945

[51] Int. Cl.² .................... B23B 27/10; B21C 37/30
[52] U.S. Cl. ........................ 408/57; 408/83; 408/705; 29/90 R
[58] Field of Search ............ 408/56, 57, 58, 59, 408/60, 61, 72 R, 72 B, 79, 80, 81, 82, 83, 146, 149, 181, 182, 186, 192, 206, 223, 224, 225, 205, 705, 709; 29/90 R; 407/18, 19

[56] References Cited

U.S. PATENT DOCUMENTS

| 1,324,459 | 10/1919 | Maier | 408/182 |
| 2,014,679 | 9/1935 | Eckroate | 408/57 |
| 2,283,497 | 5/1942 | Fields et al. | 408/57 |
| 2,863,341 | 12/1958 | Rosato et al. | 408/59 |
| 2,873,632 | 2/1959 | Bissey | 408/57 |
| 3,033,062 | 5/1962 | Carlstedt | 408/59 |
| 3,348,434 | 10/1967 | Plummer | 408/83 |
| 3,762,828 | 10/1973 | Faber | 408/705 |
| 3,795,957 | 3/1974 | Steusloff | 408/56 X |
| 3,808,656 | 5/1974 | Lindskog | 408/57 X |

FOREIGN PATENT DOCUMENTS

| 2631666 | 1/1978 | Fed. Rep. of Germany | 408/83 |
| 1274316 | 9/1961 | France | 408/57 |
| 1389681 | 1/1965 | France | 408/57 |
| 1200127 | 7/1970 | United Kingdom | 408/57 |
| 1313295 | 4/1973 | United Kingdom | 408/83 |

Primary Examiner—Harrison L. Hinson
Attorney, Agent, or Firm—Holman & Stern

[57] ABSTRACT

A device for machining the internal wall of a cylinder has a tool head with a shank securable to a rotary and axial movable boring bar. Mounted on the periphery of the tool head are a deep hole boring bit, a paring bit and a pair of obliquely mounted smoothing rolls. There is a passage for coolant to the boring bit which decreases in size in a direction opposite to the machining direction so that the coolant is accelerated in the passage to enhance cooling and flushing of swarf. A pair of radially adjustable supporting blocks assist in supporting the tool head in the cylinder and are substantially coplanar with the boring bit. The paring bit is disposed closely behind the plane in which the blocks and the boring bit lie. Downstream of the boring bit, the coolant passage is wider and has a constant cross-section area for a limited extent. The tool head further includes a bush having a helical channel therein for passage of some of the coolant to act as a lubricant. Most of the coolant from the paring bit and the boring bit is discharged via respective channels into a cavity in the tool head as is coolant from the helical channel. The smoothing rolls are separately supplied with coolant.

10 Claims, 5 Drawing Figures

DEVICE FOR MACHINING THE INTERNAL WALL OF A CYLINDER

This invention relates to a device for machining the internal wall of a cylinder, particularly for deep hole boring, wherein a tool head is secured to a boring bar driven in rotation and with axial feed, said tool head being provided with a peripheral tool bit and cooled by a flowing coolant.

With devices of this kind the capacity of the machine tool is very largely governed by the edge life of the peripheral tool bit or bits. Furthermore, since requirements regarding interior surface quality are frequently very high, it is particularly important to preclude all risk of faults or flaws occurring. A liquid coolant is used which is also capable of washing out any metal chips or swarf and providing good lubrication for the device which is often operated at very high working speeds.

It is the aim of the present invention to achieve higher output performance for a device of the kind specified and also to cut down reject rates.

BRIEF SUMMARY OF THE INVENTION

According to this invention these aims are achieved thanks to the fact that, at least in some regions, the clear cross section for the coolant between the peripheral tool bit and the interior cylinder wall grows progressively narrower oppositely to the direction of feed. As a result of this provision the coolant, which is generally pumped in under considerable pressure, is delivered at a substantially increased flow velocity to the working region of the peripheral tool bit. The coolant flow velocity will be all the higher if there are no abrupt cross-sectional changes in the coolant flow path. In consequence of such faster flow velocity, the coefficient of heat transfer between the tool and the interior cylinder wall on the one hand, and the cooling medium on the other, will be substantially increased with a corresponding improvement in effective cooling action. In the event of the tool bit being a material-removing, or cutting bit the chips, or swarf, which are detached by such a bit, will also be removed much more quickly and effectively and carried away from the working region of the tool.

Whilst it is important that flow velocity should be substantially increased as the coolant is conducted towards the operative tool zone, it is advisable that this flow velocity should decrease in the adjoining region. For this reason a wider, and over a certain distance constant, outflow cross section is provided next to the tool bit in the direction of coolant flow away from the tool zone. The coolant may be conducted in a cooling circuit in the customary way and per se conventional means may be provided for cooling the medium and separating out swarf.

According to a further feature of this invention, a particularly great improvement in output performance is obtained by providing at least one deep-bore cutting bit on the periphery of the tool head in association with a pair of successively arranged supporting blocks which take up the component forces of the cutting action on the interior cylinder wall; the same tool head is further fitted with at least one paring bit, likewise of per se conventional design. Such an arrangement enables an extremely convenient and favourable combination of deep-bore cutting and paring with both these machining operations being simultaneously executed. In other words, a fully bored and pared cylinder interior can be produced in just one single complete pass of the tool head. With special advantage, in this kind of combination arrangement, the paring bit is sited on the line which bisects the included angle between radial rays issuing from the supporting blocks. The paring bit may be sited either within the acute angle included between the aforesaid rays or in prolongation of the angle-bisecting line in the region of the obtuse angle defined by said radial rays, which prolongation would also be considered as an angle bisecting line. The proposed combination not only affords considerably higher output performance but also a significant improvement in quality. For example, superficial flaws resulting from so-called chatter marking which is liable to be caused by the supporting blocks, are virtually ruled out. Moreover, it is possible to set a very precisely pre-determined tolerance for a subsequent smoothing operation by means of smoothing rolls and thereby completely exclude the risk of overlapping during this operation.

Whilst the deep-bore cutting bit may be set to work up to 20 mm depth of cut, related to the diameter differential, the corresponding depth of cut for the paring tool is preferably of the order of 1.5 to 3 tenths of a mm. In this way the above mentioned very precise tolerances can be predetermined during the paring operation so that subsequent smooth-rolling will not involve excessively large displacements of material which could produce a scaly surface texture. Naturally the machining operation may also be adapted to other purposes by corresponding adjustability provisions for the paring tool bit.

According to a further aspect of this invention, and for the purpose of providing reliable guidance for the tool head in the cylinder interior, a guide bush is provided next to the paring bit with a spiral groove running in said bush opposite to the direction of rotation thereof, representing a flow channel for a divisional stream of coolant branched off the main stream. This divisional coolant stream here acts as a lubricant so that no significant amount of sliding friction is involved for guide bush advancement within the newly pared cylinder interior. The deliberate separation of support means on the one hand and guide means on the other contributes towards the achievement of a considerably improved precision finish for the cylinder interior which has been machined in this way.

Finally, thanks to the forced cooling system, a rotary seal revolving with the tool head may be provided axially behind and in spaced relationship with the paring bit, and behind such a seal smoothing rolls may be mounted peripherally on the tool head with their operative rolling faces extending obliquely to the direction of feed. These rolls are supplied with fresh coolant through a channel which extends axially through the tool head in the vicinity of its peripheral region to make sure that no metal parings can be pressed between the smoothing rolls and the interior cylinder wall. Thus, by fitting smoothing rolls of this type at the end of the tool head it is possible to execute all the machining of the cylinder interior in just one pass, which may be either a pushing or a drawing pass.

In order to make absolutely certain that even the smallest metal chips which are stripped off by the rotating seal will be safely evacuated and cannot enter the gap between the smoothing rolls and the inside cylinder wall, a further channel, also including an acute angle with the direction of feed, is preferably arranged forwardly of the seal for the evacuation of coolant.

According to another feature of this invention, easy adaptability of the guide bush which provides precise axial guidance for the tool head is obtained by subdividing the bush into a plurality of individual shell sections which are set up by means of set screws and retained on the tool head by means of tightening- or turn-screws. The turnscrews are in each case located between two peripherally spaced apart set screws and the shanks of said set screws are engaged in peripherally extending elongated slots. Consequently, the individual shell sections of the composite guide bush can be adapted to suit various diameter, the set screws being pushed in their elongated slots further towards the turnscrews for smaller diameters, and further away from the medially positioned turnscrews towards the edge of the shell section for larger diameters. In order to provide reliable support for the inner heads of the set screws, the length of the elongated slots measured in the peripheral direction is shorter than the diameters of said inner screw heads. In this way it is possible to change the diameter of the composite guide bush by a few simple manipulations and the bush will correspond all the more closely to the ideal circular configuration, the more shell sections are provided to form the composite bush. It was found particularly advantageous to use a guide bush which was made up from four individual shell sections.

DETAILED DESCRIPTION OF THE DRAWINGS

Figure 1:
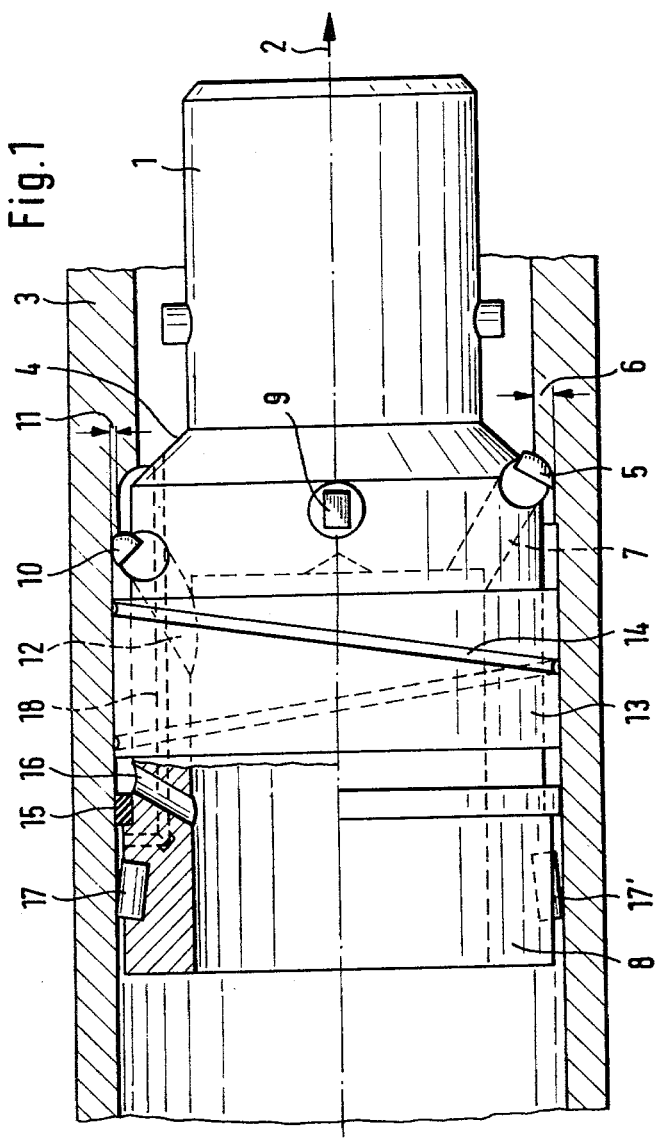
FIG. 1 is a part-sectional, longitudinal view of a first embodiment of the invention engaged within a cylinder which is shown in section.

FIG. 1 shows the device according to this invention in the form of a general and full combination, the tool head being secured by a shank 1 thereof to the end of a boring bar. By means of this bar, which is not specifically illustrated, the tool head is driven in rotation within a cylinder 3 as well as being progressively advanced in a feed direction indicated by arrow 2. It will be seen that the tool head has a tapered transitional region 4 next to the tool-carrying region thereof, wherein coolant passing along the space between the cylinder 3 and the shank is accelerated. The material of the cylinder 3 is first machined by a deep hole boring bit 5, working at a depth of cut, indicated by 6, of up to 20 mm. The coolant forcibly washes the swarf through a channel 7 into an internal cavity 8 in the tool head so that the coolant which emerges from the cylinder 3 can be readily recirculated. FIG. 1 also shows an end view of a supporting block 9 which contributes towards the absorption of machining forces in a manner which will be described hereinafter in greater detail.

The deep-hole boring operation is followed by a paring, or peeling operation executed by a paring bit 10. In this case the depth of cut is only 2/10 mm. Immediately next to the paring bit 10, there is provided a channel 12 which has the same function as the channel 7 with regard to coolant evacuation except that only very small metal chippings remain to be removed at this point.

A guide bush 13 is provided with a helical groove 14 which is coiled oppositely to the direction of rotation of the tool head. Some of the coolant passes along the groove 14 to act effectively as a lubricant.

It will also be noted from the drawing that a circumferentially continuous ring seal 15 is arranged next to the guide bush 13 to trap the last remnants of coolant together with minute metal swarf particles contained therein and cause it to pass through a channel 16 into the internal cavity 8 in the tool head.

Cylindrical smoothing rolls 17, 17' which are mounted obliquely at the end of the whole assembly are supplied with fresh coolant through a channel 18. Owing to the inclined disposition of these rolls 17, 17', the coolant is subjected to a considerable degree of acceleration which enables it to dissipate the heat created by the consolidating final smoothing operation, and this all the more readily in view of the fact that the smoothing rolls are here operated at a comparatively slow speed. The smoothing operation could alternatively be effected in a separate working pass, in which event only the tool bits for the deep bore cutting and paring operations would be combined in one and the same toolhead. This would have the advantage of requiring only one machine for the smoothing process which as such can be applied at very fast speeds, whilst several lathes would be operating simultaneously for the much slower execution of the deep-bore cutting and paring passes.

Figure 2:
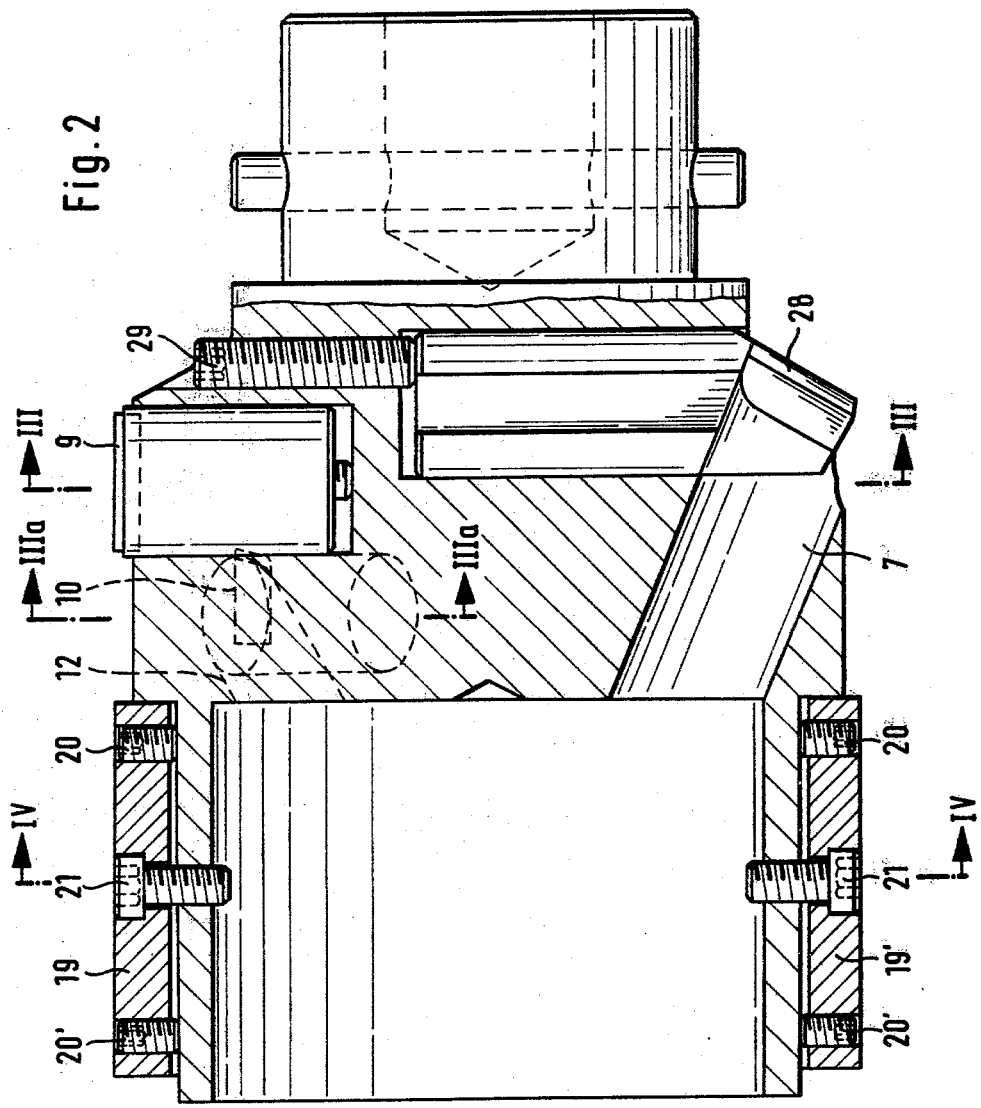
FIG. 2 is an enlarged view, partly in longitudinal section, of another embodiment of the invention, FIG. 3 and inset FIG. 3a are cross sections taken in two different planes respectively, numbered III—III and IIIa—IIIa in FIG. 2.

FIG. 2, which is drawn to a larger scale, also shows a plan- or top view of a cutting edge 28 of the deep-bore cutting bit.

The device is set up with the aid of a screw 29 having a hexagonally recessed head, to provide the required depth of cut. The upper part of FIG. 2 also shows a supporting block 9 and adjacent thereto the paring bit 10, shown in broken line. FIG. 2 also shows coolant flow channels 7 and 12.

Figure 4:
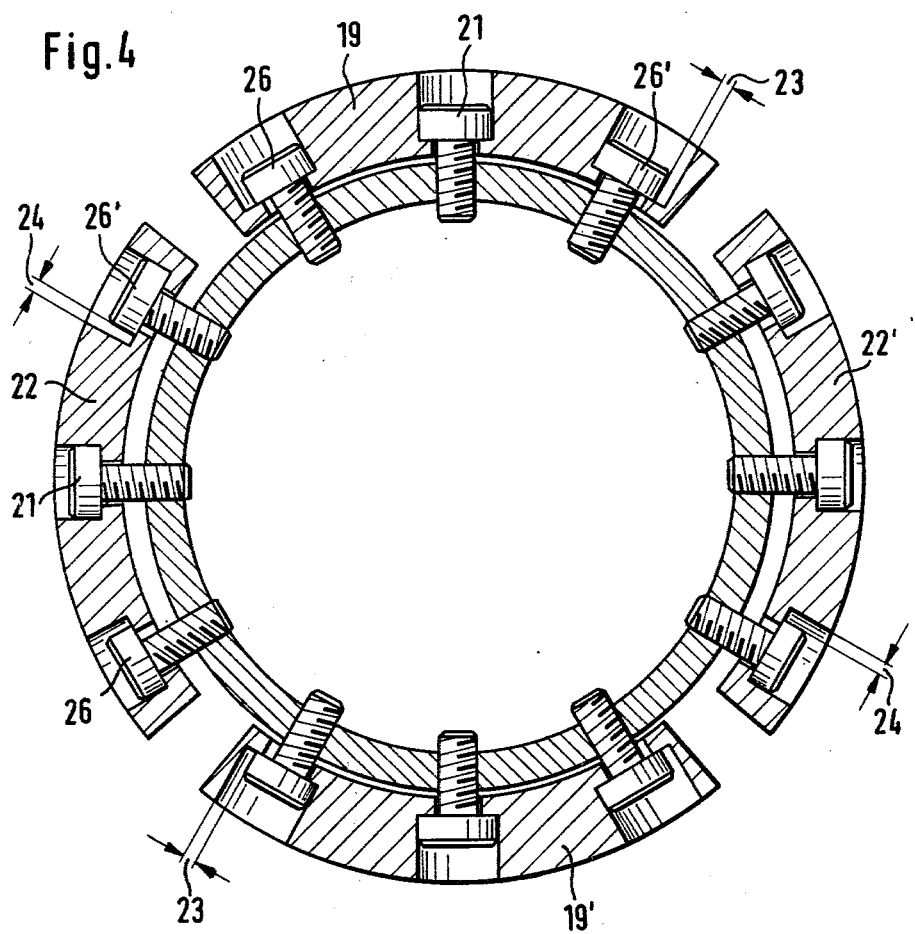
FIG. 4 is a cross section taken in the further plane IV—IV in FIG. 2.

Four peripherally spaced shell sections, of which only two diametrically opposed shell sections 19 and 19' are shown in FIG. 2, are provided on the tool head and form a composite guide bush whose diameter can be adjusted infinitely within limits. Each shell section 19 or 19' is retained in position by means of a central fixing screw 21 engaged in a circular cross-section hole in the centre of the section and by a pair of outer fixing screws 26, 26' (FIG. 4) disposed on opposite sides of the fixing screw 21. The outer fixing screws 26, 26' are engaged in elongated holes in the shell sections 19 and 19'. The other two shell sections are numbered 22 and 22', are shown in FIG. 4, are diametrically opposed and are retained in position in the same manner as shell sections 19 and 19' by means of respective fixing screws 21, 26 and 26'. FIG. 4 in fact shows two alternative thicknesses for the shell sections and two alternative radial positions therefor. The shell sections 19 and 19' are shown relatively thick and are disposed in a radially inward position whilst the shell sections 22 and 22' are shown relatively thin and are disposed in a radially outward position.

The radial position of each shell section is determined by the amount by which set screws 20 and 20' (FIG. 2) disposed in screw-threaded holes in each section project inwardly beyond the inner surface of the section. In the case of the shell sections 19 and 19', the set screws 20 and 20' project inwardly hardly at all. In this position, the fixing screws 21, 26 and 26' can be tightened down to hold the sections 19 and 19' in the radially inward position. It will be seen that, under these conditions, each of the fixing screws 26 and 26' abuts against an end wall of its respective elongate hole which is nearest to the fixing screw 21 so as to leave a gap 23 between the opposite end wall of the elongate hole and the screw 26, 26'. In the case of the shell sections 22 and 22', the set screws (which are not shown for these sections) project radially inwardly of the inner wall of the shell sections 22 and 22' by a substantial amount. Tightening of the fixing screws 21, 26 and 26' thus causes the shell sections 22 and 22' to be held in the radially outward position. In this position, the end wall of each elongated hole remote from the fixing screw 21 abuts against the respective fixing screw 26 whereby a gap 24 is provided between the end wall of the elongated hole adjacent the fixing screw 21 and the respective fixing screws 26, 26'.

Figure 3:
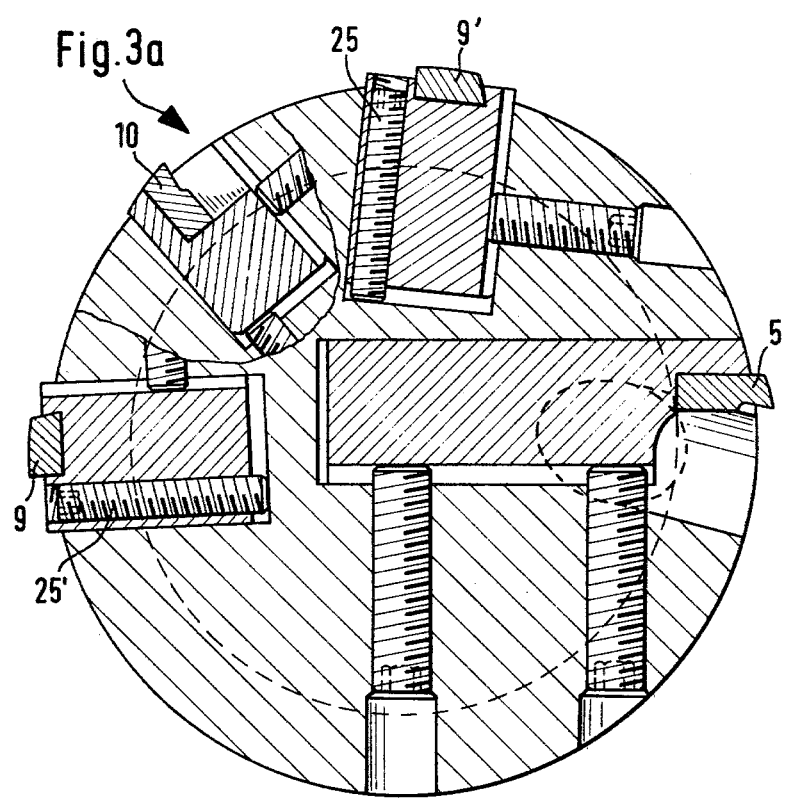

Referring now to FIG. 3 and inset FIG. 3a, the positional relationship between the supporting blocks 9 and 9' and the bits 5 and 10 can be seen. As previously mentioned, the cutting force load exerted on this tool bit is taken up by the supporting blocks 9 and 9'. As can also be seen the blocks 9 and 9' are disposed in the same transverse plane as the bit 5 but are axially offset from the bit 10. Screws 25 and 25' having hexagonally recessed ends are provided for setting the radial portions of the blocks 9 and 9'. The provision of a single screw 25 or 25' is considered to be quite sufficient for each block 9 or 9'. As can be further seen from FIGS. 3 and 3a, the bit 10 is disposed midway between the blocks 9 and 9' in the circumferential direction.

Preferably, the transverse plane in which the paring bit 10 is situated is as near as possible to the plane containing the supporting blocks 9 and 9'. As can be seen from FIG. 1, the bit 10 is disposed in a transverse plane which is immediately adjacent to that containing the blocks 9, 9'.

I claim:

1. A draw boring head including a cutter mounting portion of substantially constant diameter, a shank portion of reduced diameter compared to said cutter mounting portion, a tapered transitional zone between said cutter mounting portion and said shank portion, a deep bore cutting bit located at a juncture between said cutter mounting portion and said transitional zone, supporting blocks radially oriented to counteract the components of cutting forces and a pairing bit located between said supporting blocks in a position trailing and angularly offset from said deep bore cutting bit.

2. The device according to claim 1, wherein the paring bit is sited on a line bisecting an angle which is included between radial lines passing through the supporting blocks.

3. The device according to claim 1, wherein there are provided separate coolant flow channels, immediately adjacent the deep bore cutting bit and the paring bit, each channel being disposed at an acute angle relative to the machining direction.

4. The device according to claim 1, wherein a guide bush is provided on the tool head adjacent the paring bit, said guide bush having a helical groove coiled oppositely with respect to the direction of rotation of the tool head for conducting a stream of coolant.

5. The device according to claim 1, wherein a seal is provided on the tool head for rotation therewith, said seal being spaced from the paring bit, and smoothing rolls are mounted peripherally on the tool head with operative faces thereof obliquely inclined relative to the machining direction said rolls being disposed on the opposite side of the seal to the paring bit and being supplied with coolant by means of a channel which extends axially through the tool head in the vicinity of its periphery said channel having an inlet disposed in front of the deep bore cutting bit.

6. The device according to claim 5, wherein on the paring bit side of said seal, there is provided outlet channel for coolant, said outlet channel being disposed at an acute angle with respect to the machining direction.

7. The device according to claim 1, wherein each of the supporting blocks is itself adjustable relative to the tool head by only one radially directed screw.

8. The device according to claim 4, wherein the guide bush consists of a plurality of shell sections and each shell section is mounted on the tool head by means of a plurality of fixing screws and set screws to enable the section to be adjusted radially, wherein a pair of peripherally spaced fixing screws are disposed in respective peripherally extending elongated holes in each section on opposite sides of another fixing screw for said section.

9. The device according to claim 8, wherein the peripheral length of each elongated slot is less than the diameters of an inner head of the respective fixing set screw.

10. A device according to claim 1, wherein the paring bit is arranged in the axial direction immediately adjacent the supporting blocks.

* * * * *